US011609843B2

(12) United States Patent
Singh et al.

(10) Patent No.: US 11,609,843 B2
(45) Date of Patent: Mar. 21, 2023

(54) SYSTEMS AND METHODS FOR VALIDATION OF CONFIGURATIONS AND/OR DEPENDENCIES ASSOCIATED WITH SOFTWARE, SOFTWARE COMPONENTS, MICROSERVICES, FUNCTIONS AND THE LIKE

(71) Applicant: AT&T Intellectual Property I, L.P., Atlanta, GA (US)

(72) Inventors: Nishan Singh, Freehold, NJ (US); Abdulla Udaipurwala, Monroe Township, NJ (US); Kulbhusan Azad, Sayreville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 155 days.

(21) Appl. No.: 17/230,535

(22) Filed: Apr. 14, 2021

(65) Prior Publication Data

US 2022/0334956 A1 Oct. 20, 2022

(51) Int. Cl.
*G06F 11/36* (2006.01)
*G06F 8/10* (2018.01)

(52) U.S. Cl.
CPC ............ *G06F 11/3688* (2013.01); *G06F 8/10* (2013.01); *G06F 11/3664* (2013.01)

(58) Field of Classification Search
CPC .. G06F 11/36; G06F 11/3688; G06F 11/3664; G06F 8/10
See application file for complete search history.

(56) References Cited

U.S. PATENT DOCUMENTS

| 7,536,679 | B1 * | 5/2009 | O'Connell | .......... | G06F 11/3684 |
| | | | | | 714/39 |
| 9,680,779 | B2 * | 6/2017 | Marovets | ................ | H04L 51/08 |
| 2006/0106897 | A1 * | 5/2006 | Sapozhnikov | ............ | G06F 8/38 |

(Continued)

*Primary Examiner* — Kamini B Patel
(74) *Attorney, Agent, or Firm* — Guntin & Gust, PLC; Matthew Tropper

(57) ABSTRACT

Aspects of the subject disclosure may include, for example, receiving instructions to validate a configuration associated with an application under test, the instructions identifying the application under test that exists in a first particular software environment that is selected from among a plurality of software environments; receiving dependency data, the dependency data identifying a dependency application that exists in a second particular software environment that is selected from among the plurality of software environments; performing a first process to determine whether the application under test that exists in the first particular software environment can be instantiated as a first running application, the first process resulting in a first determination; responsive to the first determination being that the application under test that exists in the first particular software environment can be instantiated as the first running application, automatically performing with no user interaction a second process to determine whether the dependency application that exists in the second particular software environment can be instantiated as a second running application, the second process resulting in a second determination; and automatically outputting with no user interaction a report indicating the first determination and the second determination. Other embodiments are disclosed.

20 Claims, 13 Drawing Sheets

(56) References Cited

U.S. PATENT DOCUMENTS

| | | | |
|---|---|---|---|
| 2009/0172636 A1* | 7/2009 | Griffith | G06F 11/3664 |
| | | | 717/113 |
| 2013/0151681 A1* | 6/2013 | Dournov | G06F 8/656 |
| | | | 718/103 |
| 2013/0290500 A1* | 10/2013 | Narendra | H04L 67/51 |
| | | | 709/223 |
| 2016/0335316 A1* | 11/2016 | Riva | G06F 11/3072 |
| 2017/0289338 A1* | 10/2017 | Riva | G06F 9/485 |
| 2017/0289339 A1* | 10/2017 | Riva | H04M 1/72445 |
| 2019/0294606 A1* | 9/2019 | Riva | G06F 16/2428 |
| 2020/0026640 A1* | 1/2020 | Dhanaraj | G06F 11/3684 |
| 2022/0076841 A1* | 3/2022 | Abu El Ata | G16H 50/20 |

* cited by examiner

SYSTEMS AND METHODS FOR VALIDATION OF CONFIGURATIONS AND/OR DEPENDENCIES ASSOCIATED WITH SOFTWARE, SOFTWARE COMPONENTS, MICROSERVICES, FUNCTIONS AND THE LIKE

FIELD OF THE DISCLOSURE

The subject disclosure relates to systems and methods for validation of configurations and/or dependencies associated with software, software components, microservices, functions and the like.

BACKGROUND

As technology has evolved, traditional monolithic applications have moved towards being split into small reusable components/microservices/functions. Each such application can have one or more clients in a given ecosystem (the clients can be provided, for example, by respective providers, such as respective programmers or groups of programmers). Further, there can be multiple releases (for instance, 1.0, 1.1, 1.2, 2.0, 2.1, 3.0, etc. or, for instance, May 2020, June 2020, etc.) and multiple environments (e.g., DEV (development), TEST (testing), PST (platform system testing), PM (production mirror), PROD (production), etc.).

Tracking of various dependencies within the ecosystem has typically been performed via use of associated documentation, and/or by exchange of provider information (such exchange of provider information has been carried out, for example, via: (1) Manual communication over chat or email; (2) Auto Discovery by client based on centralized registry that is updated by provider using some pre-agreed criteria/tags).

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for validation of configurations and/or dependencies associated with software, software components, microservices and the like. Other embodiments are described in the subject disclosure.

One or more aspects of the subject disclosure include an architecture that ensures (e.g., for a given enterprise application) that all inter-dependencies (e.g., components/microservices/applications) have their correct instances configured and that those dependencies are in a healthy state (e.g., being capable of running correctly).

One or more aspects of the subject disclosure include a view into an ecosystem (e.g., into an ecosystem with multiple software environments). In one example, various embodiments can build a consolidated real-time dependency view of a "live" ecosystem.

One or more aspects of the subject disclosure include a validation of an ecosystem (e.g., an ecosystem with multiple software environments). In one example, various embodiments can validate interface dependencies and/or perform health checking. In various examples, such validation can be performed upon deployment and/or in an ad-hoc manner. In various examples, such validation can be performed dynamically (e.g., dynamically to cover scenarios such as reboot(s) by one or more included apps, environment progression(s), and/or new/updated/removed dependency). In another example, such validation can focus on whether or not an application (e.g., a client application) is really using a dependency or not.

Unlike certain traditional approaches which focus on the health of a given application only, various embodiments provide mechanisms to additionally validate the inter-system dependencies.

Figure 1B:
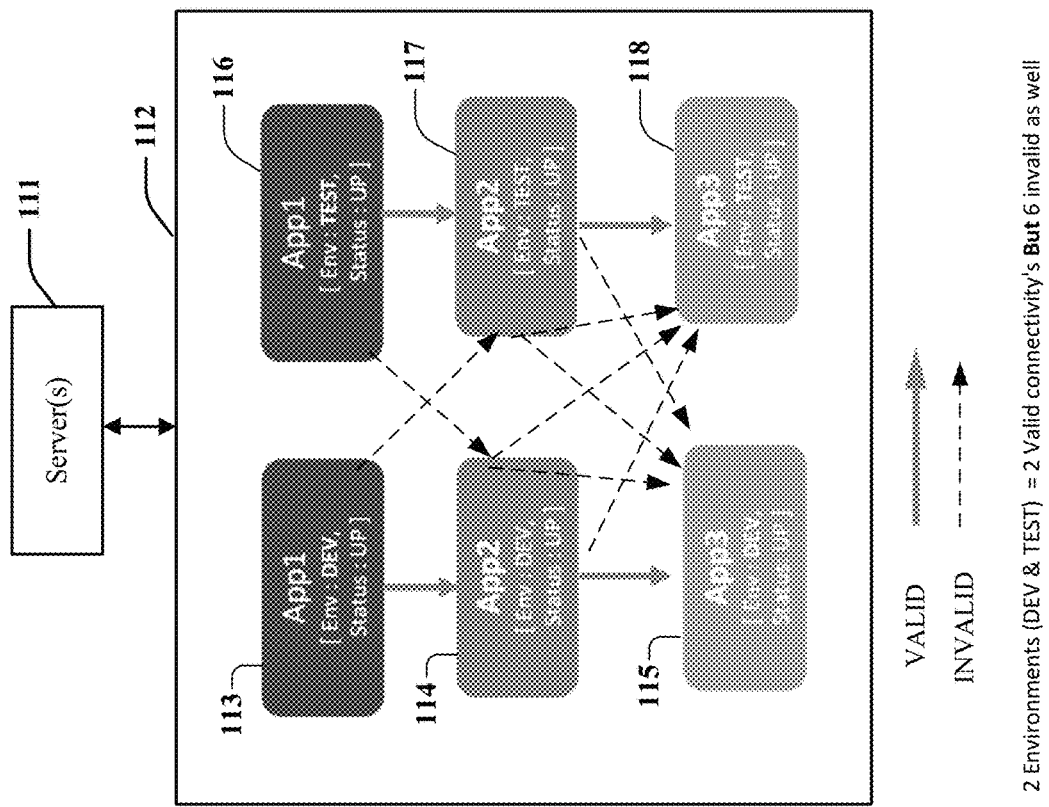
FIG. 1B is a block diagram illustrating an example, non-limiting embodiment of a system in accordance with various aspects described herein.
Figure 1A:
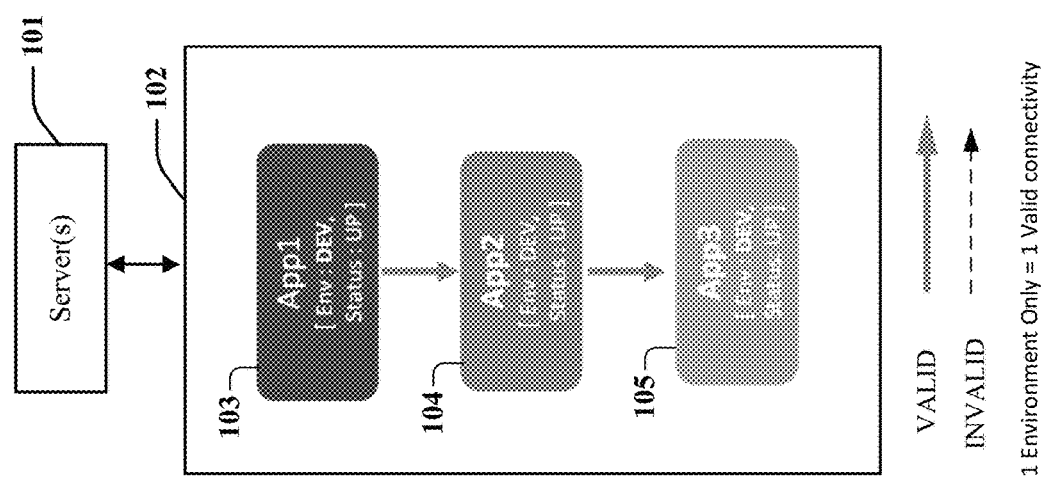
FIG. 1A is a block diagram illustrating an example, non-limiting embodiment of a system in accordance with various aspects described herein.

Referring now to FIG. 1A, a block diagram illustrating an example, non-limiting embodiment of a system 100 is shown. As seen in this example, ecosystem 102 includes three applications (App1 103, App2 104 and App3 105). Further, as seen in this example: App1 103 is present in a development (DEV) environment and a status of App1 103 is UP; App2 104 is present in the DEV environment and a status of App2 104 is UP; and App3 105 is present in the DEV environment and a status of App3 105 is UP. Since there is only 1 environment in this example ecosystem, there is only one valid connectivity (see the solid (non-dashed) arrows from App1 103 to App2 104 and from App2 104 to App3 105). Finally, it is seen that server(s) 101 are in operative bi-directional communication with ecosystem 102. The server(s) 101 can operate to provide in whole or in part validation of configurations and dependencies as described herein. In another example, the server(s) 101 can be part of ecosystem 102.

Referring now to FIG. 1B, a block diagram illustrating an example, non-limiting embodiment of a system 110 is shown. As seen in this example, ecosystem 112 includes six applications (App1 113, App2 114, App3 115, App1 116, App2 117 and App3 118). Further, as seen in this example: App1 113 is present in a development (DEV) environment and a status of App1 113 is UP; App2 114 is present in the DEV environment and a status of App2 114 is UP; App3 115 is present in the DEV environment and a status of App3 115 is UP; App1 116 is also present in a test (TEST) environment and a status of App1 116 is UP; App2 117 is also present in the TEST environment and a status of App2 117 is UP; and App3 118 is also present in the TEST environment and a status of App3 118 is UP. As seen, there are 2 environments (DEV and TEST) in this example ecosystem. In this example, there are two valid connectivities (see the solid (non-dashed) arrows from App1 113 to App2 114 and from App2 114 to App3 115; see also the solid (non-dashed) arrows from App1 116 to App2 117 and from App2 117 to App3 118). Further, in this example, there are six invalid connectivities (see the various dashed arrows). Finally, it is seen that server(s) 111 are in operative bi-directional communication with ecosystem 112. The server(s) 111 can operate to provide in whole or in part validation of configurations and dependencies as described herein. In another example, the server(s) 111 can be part of ecosystem 112.

Still referring to FIG. 1B, it is noted that more generally, a Total Number of Invalid Paths=number_Of_Env$^{(number\_of\_App)}$−number_Of_Env (for example, if number of env=2 (DEV,TEST), number of app=3, then Total Number of Invalid Paths=$2^3$−2=6; in another example, if number of env=3 (DEV,TEST,STAGING), number of app=3, then Total Number of Invalid Paths=$3^3$−3=24; in another example, if number of env=2 (DEV,TEST), number of app=4, then Total Number of Invalid Paths=$2^4$−2=14).

Figure 1C:
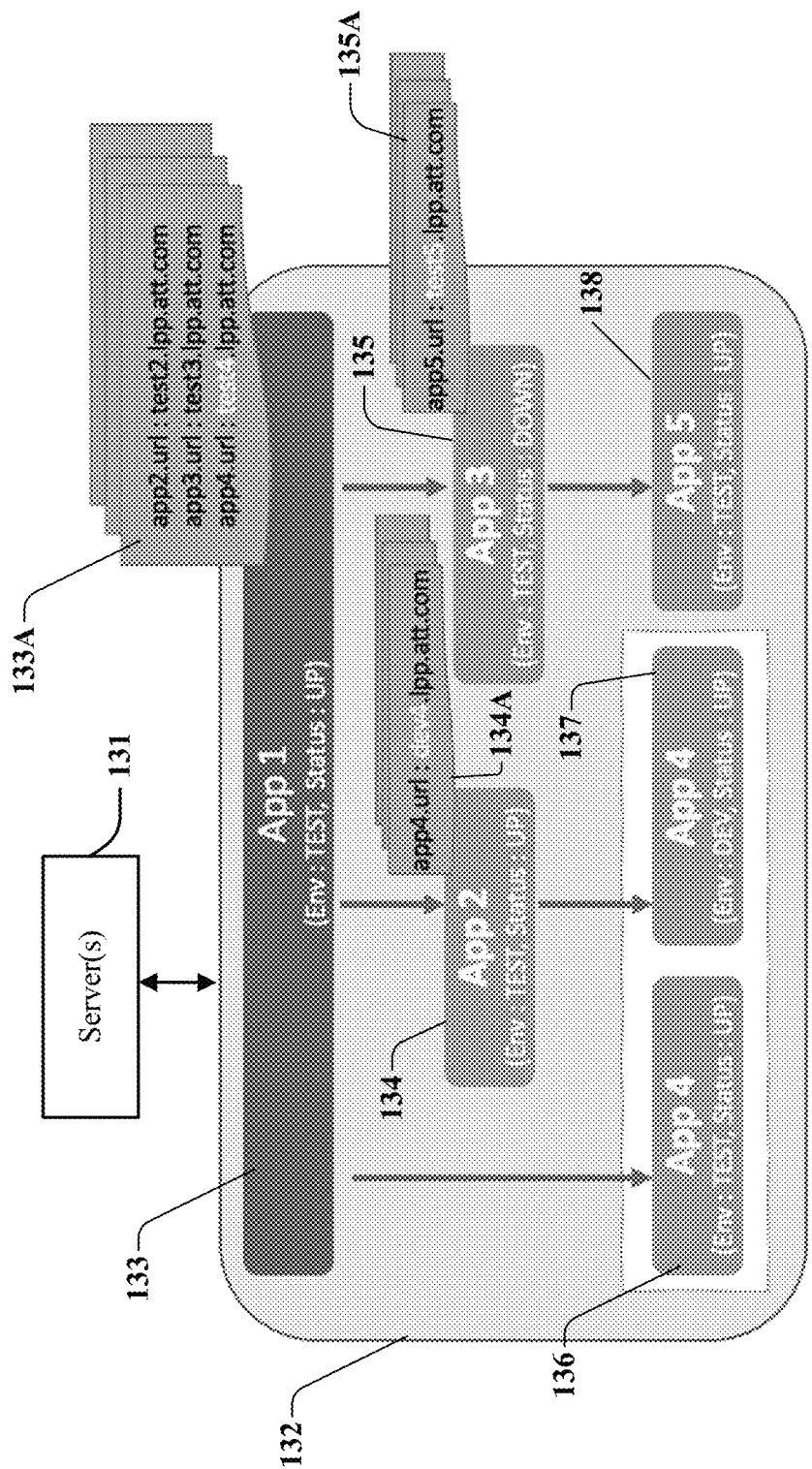
FIG. 1C is a block diagram illustrating an example, non-limiting embodiment of a system in accordance with various aspects described herein.

Referring now to FIG. 1C, a block diagram illustrating an example, non-limiting embodiment of a system 130 is shown (this example shows various clients pointing to different "flavors" of a given service—see, for instance, App4 in the TEST environment and App4 in the DEV environment). As seen in this example, ecosystem 132 includes six applications (App1 133, App2 134, App3 135, App4 136, App4 137 and App5 138). Further, as seen in this example: App1 133 is present in a test (TEST) environment and a status of App1 133 is UP; App2 134 is present in the TEST environment and a status of App2 134 is UP; App3 135 is present in the TEST environment and a status of App3 135 is DOWN; App4 136 is present in the TEST environment and a status of App4 136 is UP; App5 138 is present in the TEST environment and a status of App5 138 is UP. App4 137 is also present in a development (DEV) environment and a status of App4 137 is UP. As seen, there are 2 environments (DEV and TEST) in this example ecosystem. Further, it is seen that there is dependency data 133A associated with App1 133 (this dependency data 133A identifies a respective URL for each of App2, App3 and App4; of note, this dependency data 133A identifies for the App4 dependency the TEST environment). Further still, it is seen that there is dependency data 134A associated with App2 134 (this dependency data 134A identifies a URL for App4; of note, this dependency data 134A identifies for the App4 dependency the DEV environment). Further still, it is seen that there is dependency data 135A associated with App3 135 (this dependency data 135A identifies a URL for App5). Finally, it is seen that server(s) 131 are in operative bi-directional communication with ecosystem 132. The server(s) 131 can operate to provide in whole or in part validation of configurations and dependencies as described herein. In another example, the server(s) 131 can be part of ecosystem 132. In various embodiments, if it is determined that a downstream app (e.g., App3 135) is down, then an alert can be sent (e.g., sent automatically) to an upstream app (e.g., App1 133) and/or sent (e.g., sent automatically) to one or more people (e.g., document planners, software architects) working on and/or responsible for the upstream app.

Figure 1D:
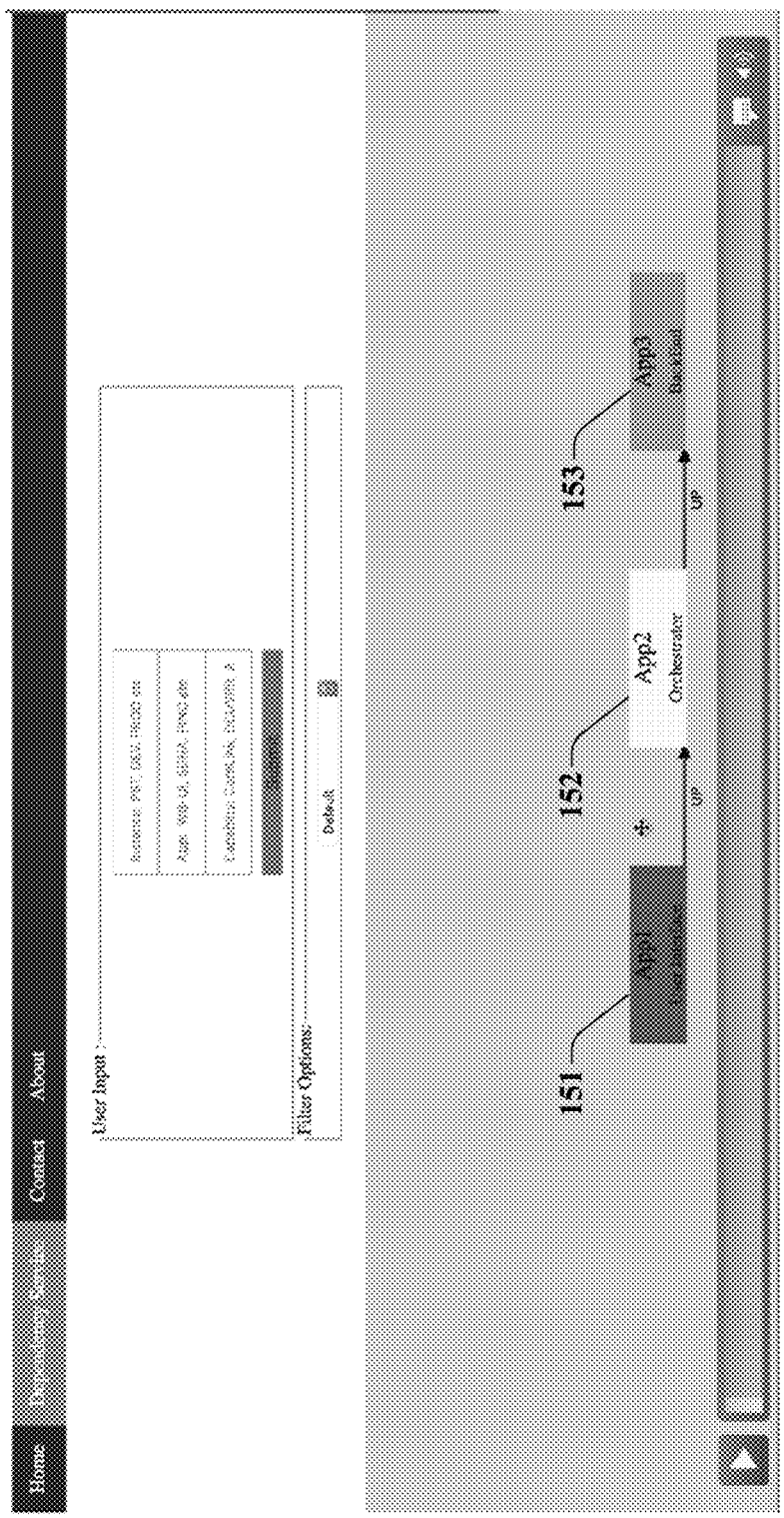
FIGS. 1D-1F are block diagrams illustrating an example, non-limiting embodiment of a dependency service user interface in accordance with various aspects described herein.
Figure 1E:
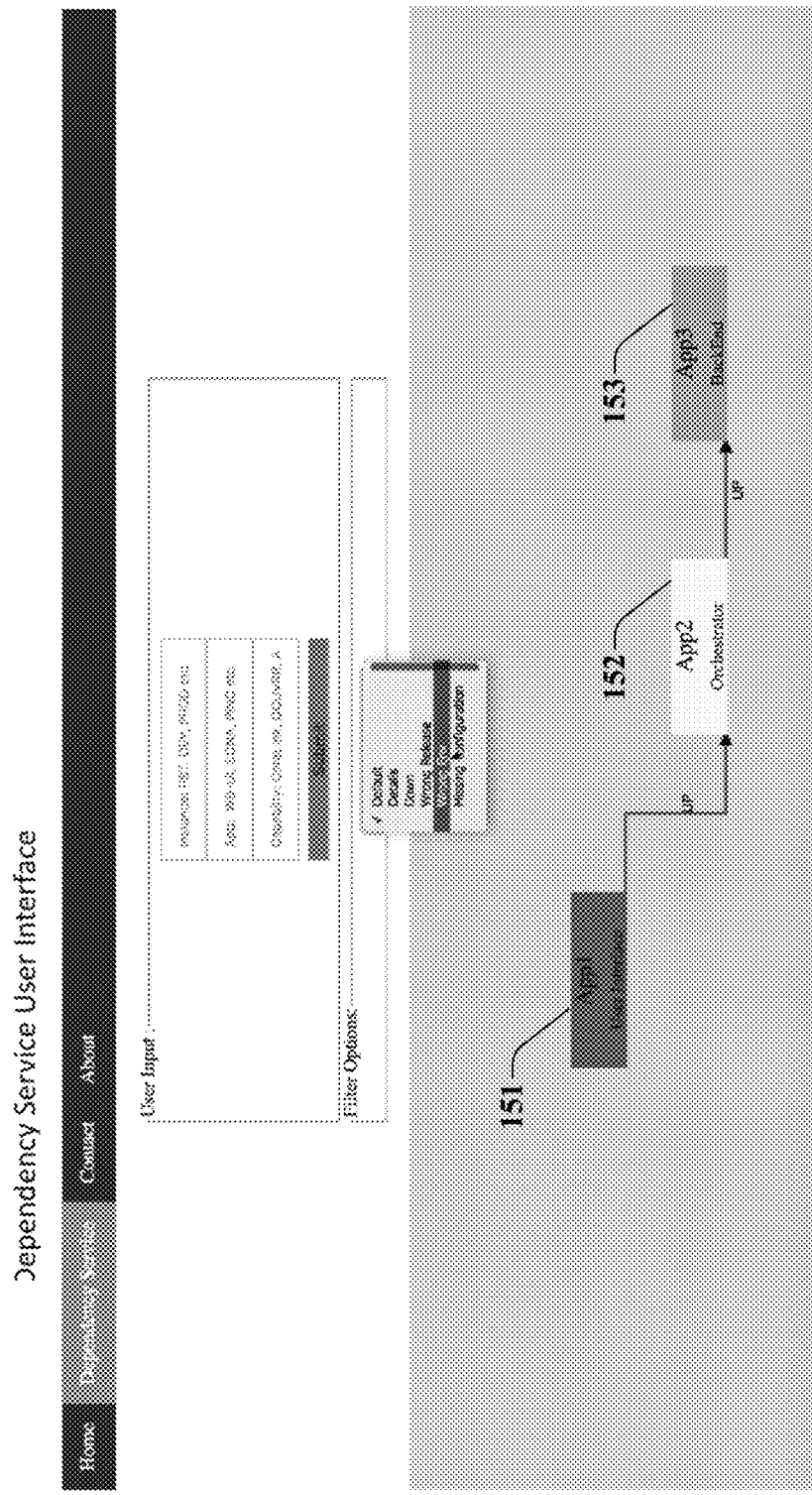
Figure 1F:
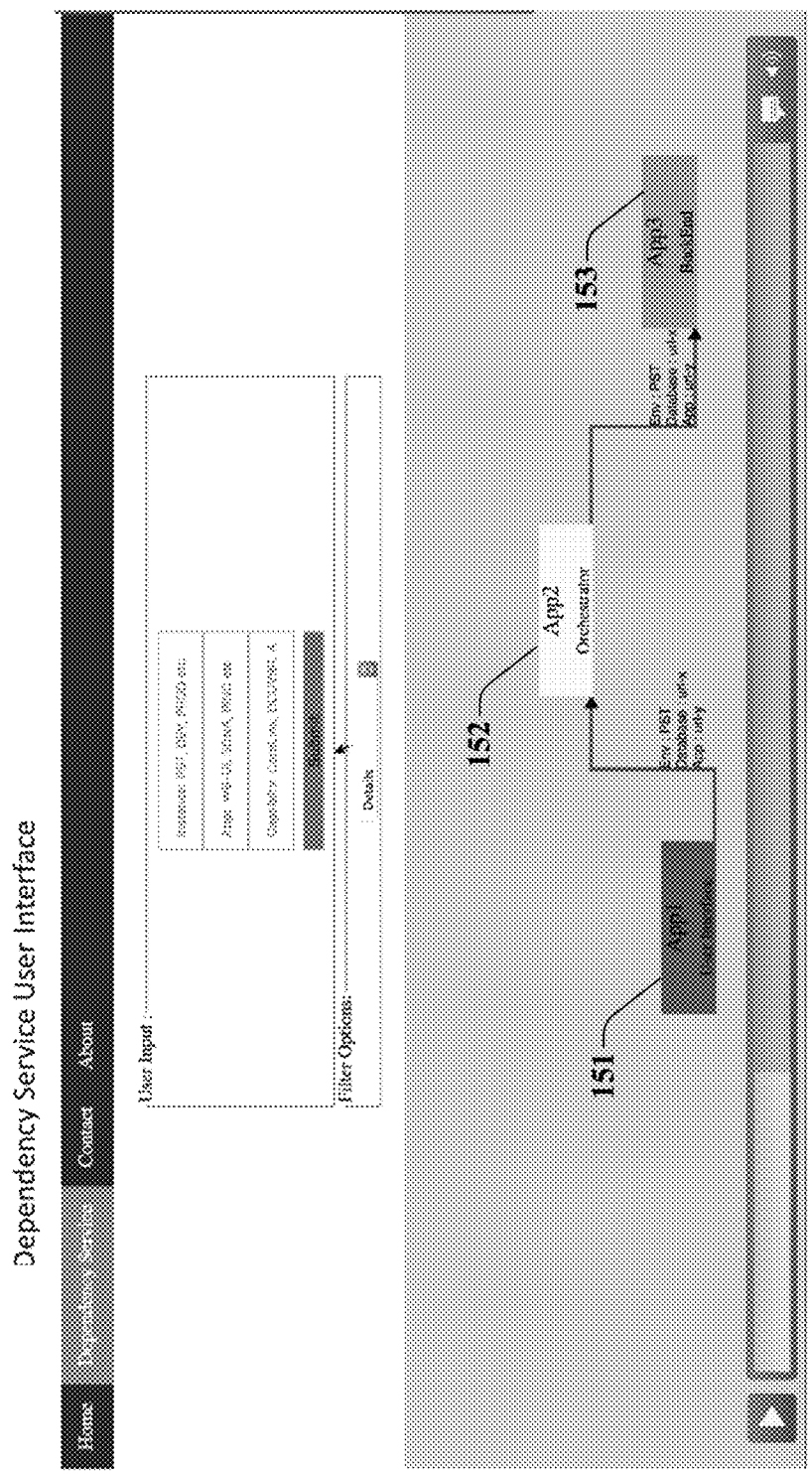

Referring now to FIGS. 1D-1F, these are block diagrams illustrating an example, non-limiting embodiment of a dependency service user interface 150 in accordance with various aspects described herein. As seen in these figures, a graphical user interface is provided in which three applications/microservices (App1 151, App2 152 and App3 153) are shown. These applications/microservices are depicted moving from an upstream position (App1 151) in a downstream direction (to App2 152 and then to App3 153). Also, depicted in these figures are indications of health or status (UP/DOWN) and various environments (e.g., PST).

Still referring to FIGS. 1D-1F, an example use can be as follows. More particularly, a user enters data in the following fields under 'User Input' section: (1) Instance: this represents the environment (e.g., DEV, TEST, PST, PM, PROD) for which he/she wants to view the dependency view; (2) App: this represents the application for which the dependency and configuration validation is being done; (3) Capability: this represents the scope that will be used to narrow down the dependency view (for example, one single application may have been in use for multiple product/service (e.g., capability), but the current user might be interested in only specific product/service related dependencies; a default could be showing all dependencies regardless of product/service).

Still referring to FIGS. 1D-1F, after the user filled in (input) the above information, then the dependency view is display. For example, App1 (element 151), App 2 (element 152), App3 (element 153) with a respective status showing an indication such as UP or DOWN. Then, if the user wants to see additional configuration(s) of these dependencies, he/she can choose from various options displayed in drop-down under 'Filter Options' section as follows: (1) Default: in this case, only status of dependency is shown (such as UP or DOWN); (2) Details: This would show all the configuration details (including status, database URL, app URL etc.); (3) Wrong Env: This means this particular dependency is pointing to wrong environment; (4) Missing Configuration: This means there should be a dependency; however, the live system is missing this configuration.

Figure 1G:
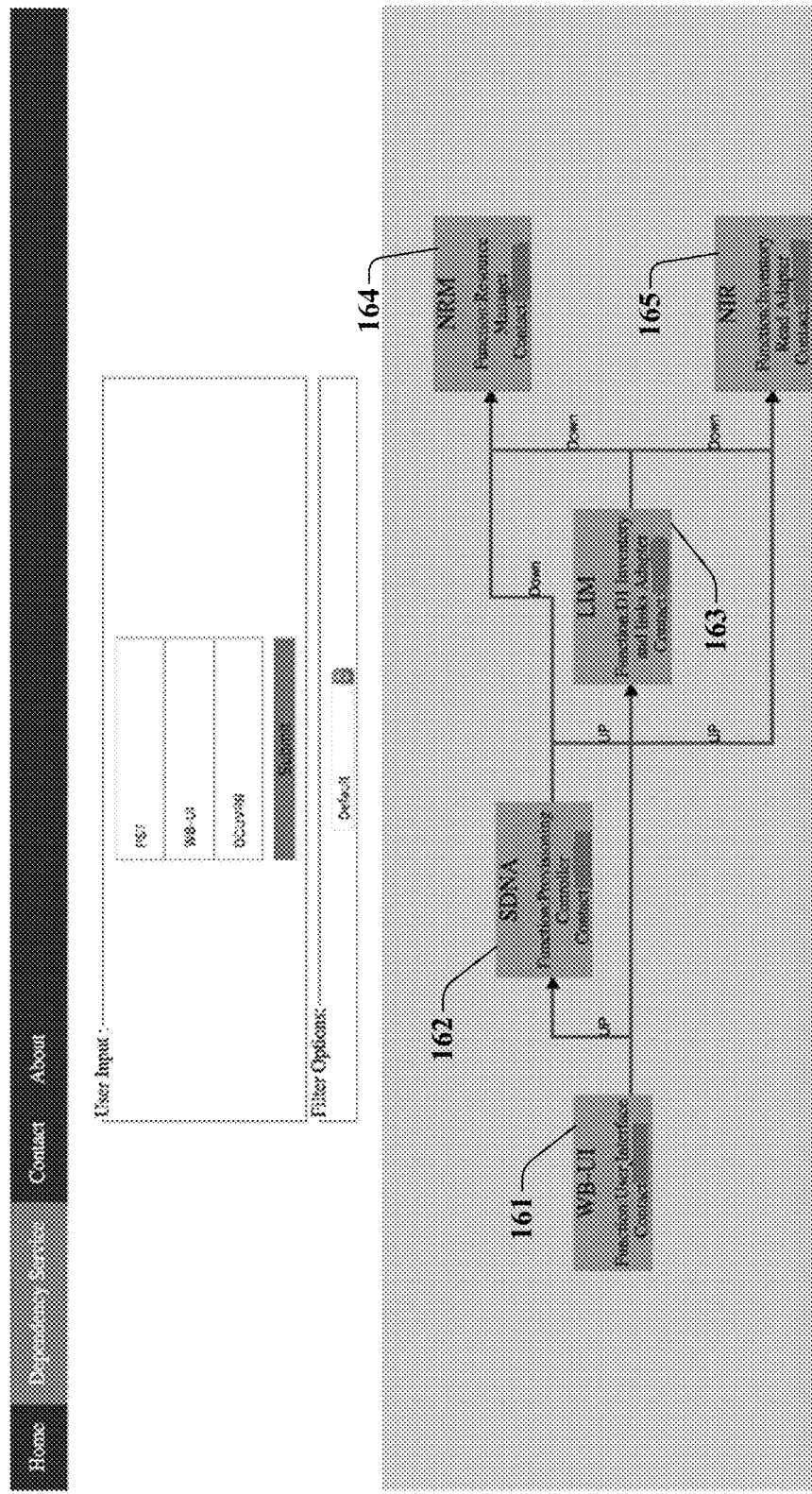
FIGS. 1G-1H are block diagrams illustrating an example, non-limiting embodiment of a dependency service user interface in accordance with various aspects described herein.
Figure 1H:
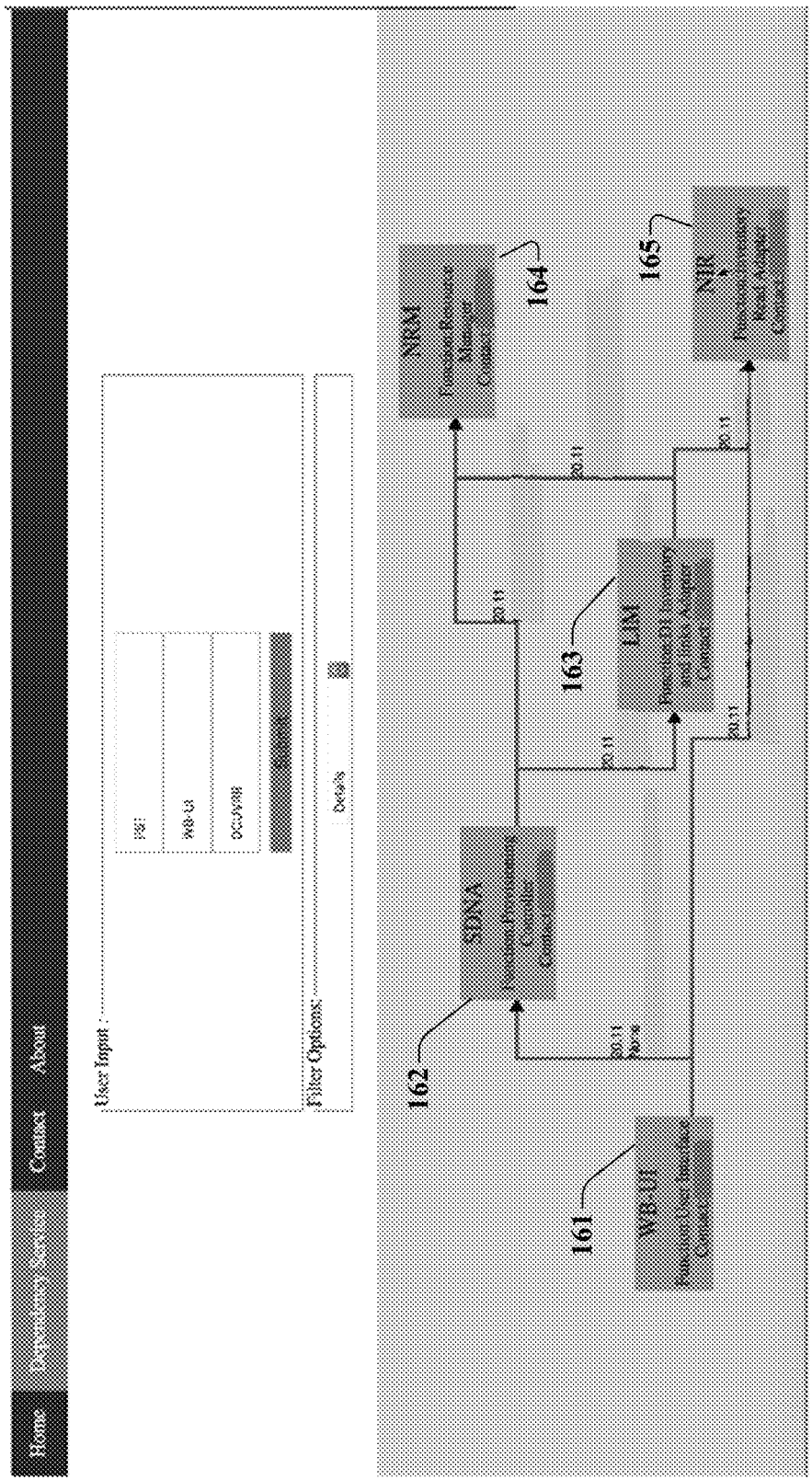

Referring now to FIGS. 1G-1H, these are block diagrams illustrating an example, non-limiting embodiment of a dependency service user interface 160 in accordance with various aspects described herein. As seen in these figures, a graphical user interface is provided in which six applications/microservices (WB-UI 161, SDNA 162, LIM 163, NRM 164 and NIR 165) are shown. These applications/microservices are depicted moving from an upstream position (WB-UI 161) in a downstream direction. Also, depicted in these figures are indications of health or status (e.g., UP/DOWN) and indicators that can provide various contact information (such contact information can be, for example, an email of a responsible programmer or the like). Use of the User Interface as shown in these FIGS. 1G-1H can be similar to that described above with reference to FIGS. 1D-1F.

Figure 2:
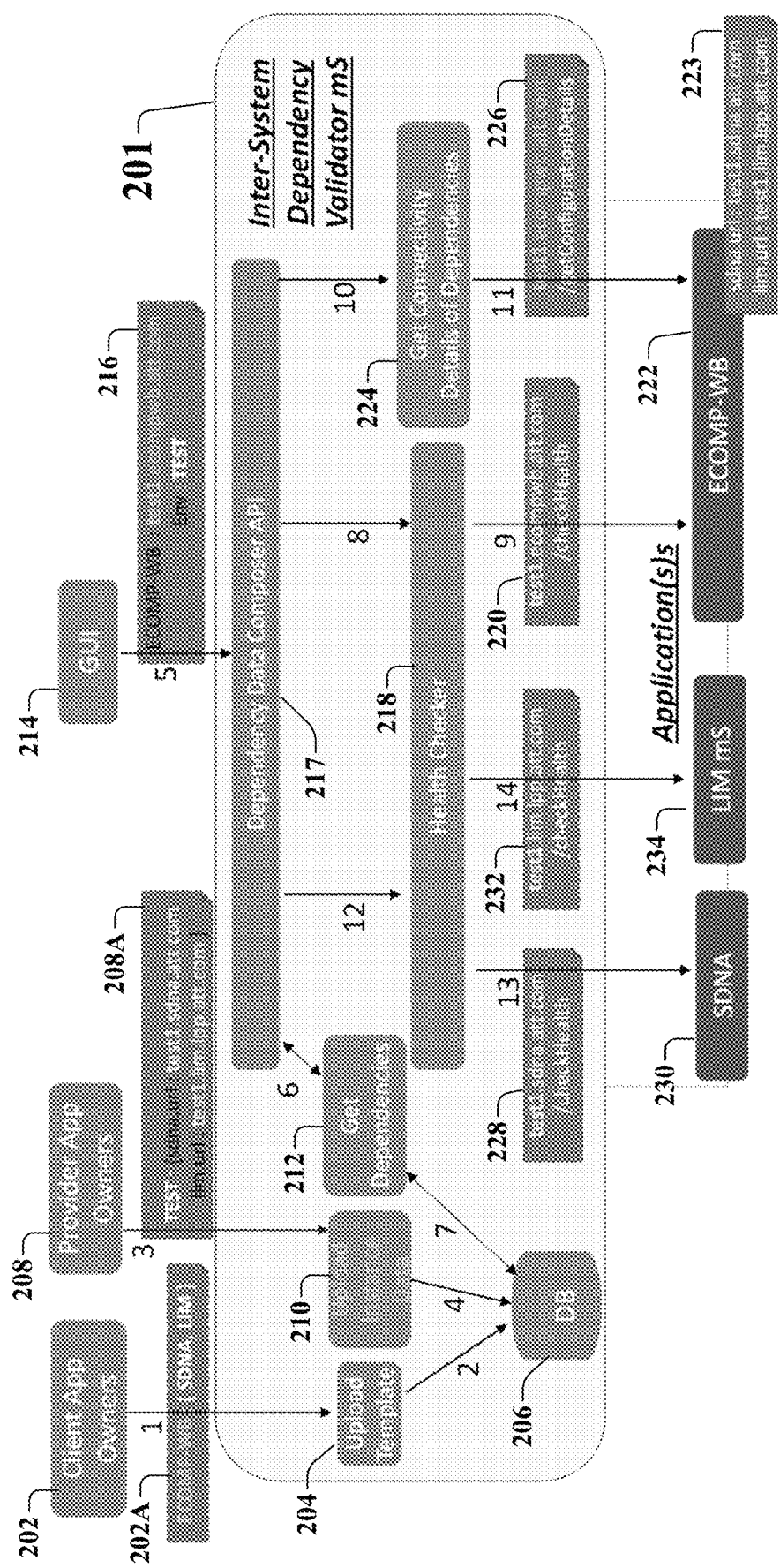
FIG. 2 is a block diagram illustrating an example, non-limiting embodiment of a system in accordance with various aspects described herein.

Referring now to FIG. 2, a block diagram associated with a system 200 according to an embodiment is shown. As seen, this system 200 includes an inter-system dependency validator 201 (in one example, this inter-system dependency validator 201 can be configured as a microservice itself).

Still referring to FIG. 2, it is seen that at steps 1 and 2, metadata is uploaded (e.g., pushed by client apps automatically or manually by their owners). More particularly, metadata 202A (in this example, "ECOMP-WB:{SDNA, LIM}")

is provided (see arrows 1 and 2) from one or more client app owners 202 (and/or from one or more client apps) to database (DB) 206 via the functionality of Upload Template 204. In this example, the "ECOMP-WB" is the name of an application and the "SDNA, LIM" are the names of two dependencies. In another example, the metadata 202A can be as follows:
App1: Health=/health,Dependencies: App2, App4
App2: Health=/health,Dependencies: App4
App3: Health=/health
App4: Health=/health Still referring to FIG. 2, it is seen that at steps 3 and 4, instance data is uploaded (e.g., pushed by provider apps automatically or manually by their owners). More particularly, instance data 208A (in this example, "TEST:{sdna.url: test1.sdna.att.com lim.url:test1.lim.lpp.att.com}") is provided (see arrows 3 and 4) from one or more provider app owners 208 (and/or from one or more provider apps) to DB 206 via the functionality of Upload Instance Data 210. In this example, the "sdna.url:test1.sdna.att.com" is the URL to the SDNA dependency and the "lim.url: test1.lim.lpp.att.com" is the URL to the LIM dependency. In another example, the instance data can be as follows: App1: Dev=http://com.att.lpp.app1.dev, Test=http://com.att.lpp.app1-test. In another example, the instance data can be obtained by integrating with an existing service registry/discovery tool (e.g., that has a mapping of environments to instances) to get the information dynamically.

Still referring to FIG. 2, it is seen that at step 5 the process begins to operate as a "live" configuration/dependency validation. More particularly, at step 5 the inter-system dependency validator 201 is instructed (see arrow 5) via graphical user interface (GUI) 214 to begin a dependency validation check for (in this example) ECOMP-WB (the "application under test") for the TEST environment (see element 216 indicating this information that is passed to Dependency Data Composer API 217). Further, as seen at steps 6 and 7, the Dependency Data Composer API 217 gets the dependency metadata for ECOMP-WB (in this example, the dependencies being SDNA and LIM) from DB 206 via the functionality of Get Dependencies 212 (see arrows 6 and 7). Further still, as seen at steps 8 and 9, a process is carried out to check the health of ECOMP-WB. This can be facilitated by getting a health URL from the metadata DB 206 and by making a call to the health URL (see, e.g., element 220) via the functionality of Health Checker 218 (see arrows 8 and 9).

Still referring to FIG. 2, it is seen that at steps 10 and 11 the configured instance data (for, in this example, ECOMP-WB) is obtained via the functionality of Get Connectivity Details Of Dependencies 224. In this example, the configuration details (see element 226) can be obtained via a getDependencies API. Further, the application under test (in this example, ECOMP-WB 222 can be instantiated (element 223 shows the two dependencies of the instantiated ECOMP-WB 222).

Still referring to FIG. 2, it is seen that at steps 12-14, similar steps are carried out for each of dependencies SDNA 230 and LIM mS 234. More particularly, SDNA 230 is instantiated and its health is checked (see arrows 12 and 13 and element 230) and LIIM mS is instantiated and its health is checked (see arrows 12 and 14 and element 234). Further, recursive operations can be carried out on SDNA 230 (e.g., to check the existence and health of its dependencies) and recursive operations can be carried out on LIM mS 234 (e.g., to check the existence and health of its dependencies). In one example, the recursive operations can be carried out in parallel for n number of dependencies (e.g., n number of dependencies of the application under test). In one specific example, step 5 onward can be carried out recursively. In one specific example, all apps retrieved from step 6 can be operated on recursively (e.g., carry out steps 12, 13, 14, etc. recursively).

Still referring to FIG. 2, in one example: elements 202 and 208 are ecosystem app owners; elements 222, 230 and 234 are ecosystem apps; elements 214, 204, 206, 210, 212, 217, 218 and 224 relate to data/payload; and elements 202A, 208A, 216, 228, 232, 220 and 226 relate to metadata and/or solution modules.

In various examples, any missing dependencies and/or any dependencies that are not in the correct environment can be flagged or otherwise identified (e.g., identified in a GUI). In various examples, any uploads can be via email and/or via Wiki. In various examples, a button (e.g., GUI button) can be used to trigger an application to fix a misconfiguration. In various examples, a "/checkhealth" function can be used to determine status, such as DOWN or UP (e.g., a binary test). In various examples, validation can be performed for a given application or microservice. In various examples, functionality can be provided via an API and/or via a UI (e.g., dropdown(s)). In various examples, a "/checkHealth" function (which can be accessed via an API) can be implemented such that if the function does not succeed (e.g., a microservice is DOWN), then the system does not need to check further configurations/dependencies.

Figure 3A:
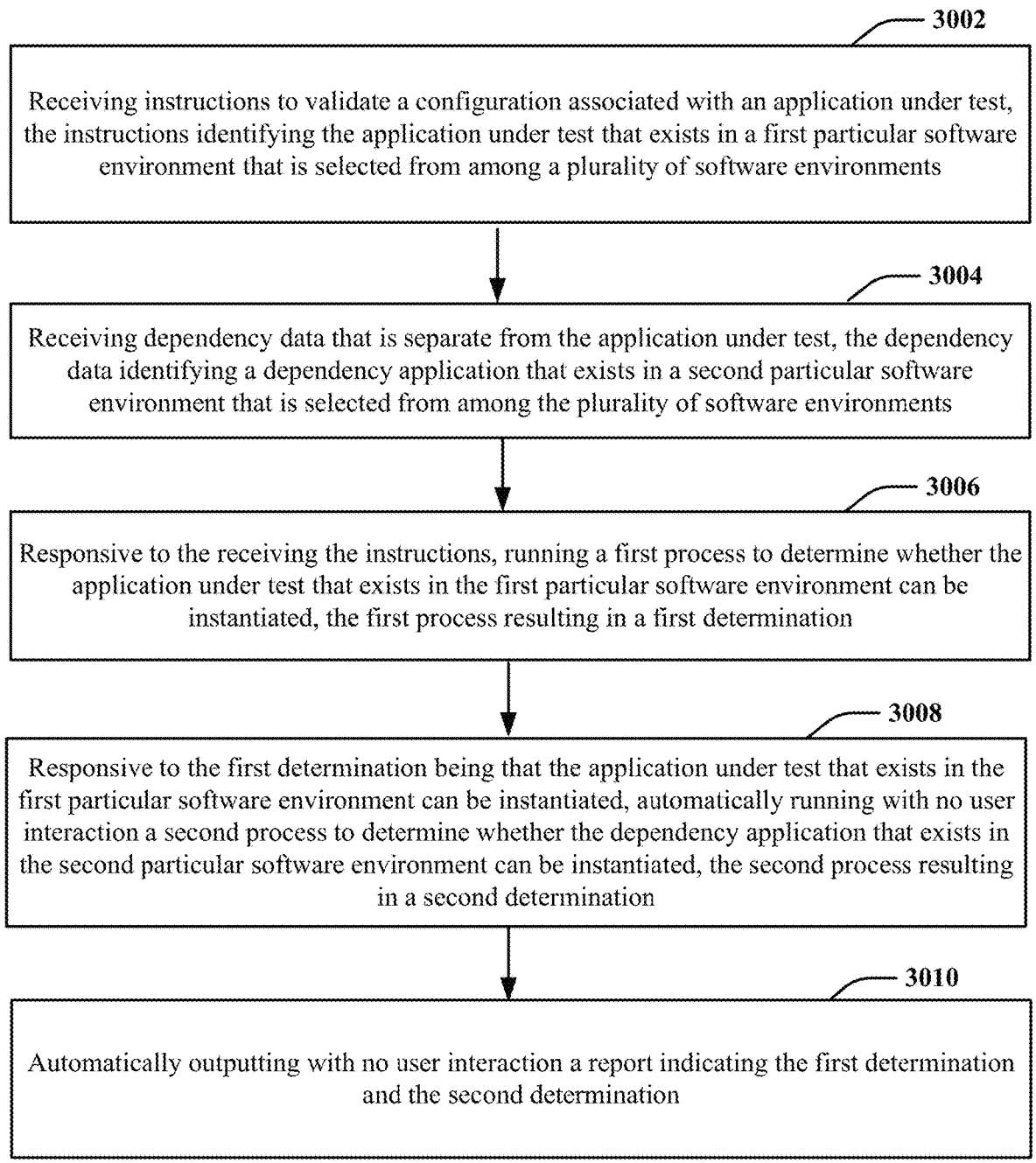
FIG. 3A depicts an illustrative embodiment of a method in accordance with various aspects described herein.

Referring now to FIG. 3A, various steps of a method 3000 according to an embodiment are shown. As seen in this FIG. 3A, step 3002 comprises receiving instructions to validate a configuration associated with an application under test, the instructions identifying the application under test that exists in a first particular software environment that is selected from among a plurality of software environments. Next, step 3004 comprises receiving dependency data that is separate from the application under test, the dependency data identifying a dependency application that exists in a second particular software environment that is selected from among the plurality of software environments. Next, step 3006 comprises responsive to the receiving the instructions, running a first process to determine whether the application under test that exists in the first particular software environment can be instantiated (e.g., made into a running instance), the first process resulting in a first determination. Next, step 3008 comprises responsive to the first determination being that the application under test that exists in the first particular software environment can be instantiated, automatically running with no user interaction a second process to determine whether the dependency application that exists in the second particular software environment can be instantiated (e.g., made into a running instance), the second process resulting in a second determination. Next, step 3010 comprises automatically outputting with no user interaction a report indicating the first determination and the second determination.

While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3B:
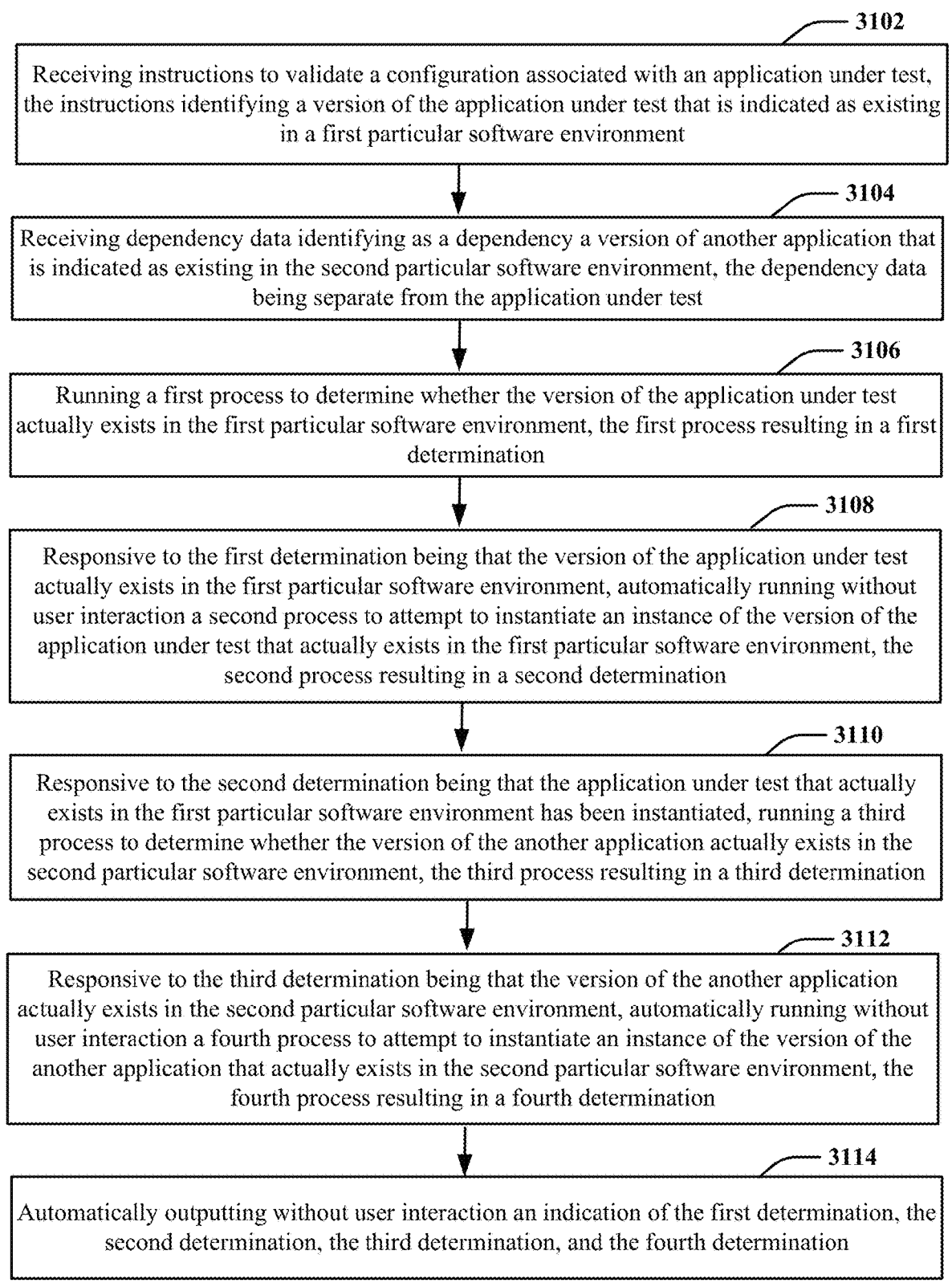
FIG. 3B depicts an illustrative embodiment of a method in accordance with various aspects described herein.

Referring now to FIG. 3B, various steps of a method 3100 according to an embodiment are shown. As seen in this FIG. 3A, step 3102 comprises receiving instructions to validate a configuration associated with an application under test, the instructions identifying a version of the application under test that is indicated as existing in a first particular software environment. Next, step 3104 comprises receiving dependency data identifying a dependency a version of another application that is indicated as existing in a second particular software environment, the dependency data being separate from the application under test. Next, step 3106 comprises running a first process to determine whether the version of the application under test actually exists in the first particular software environment, the first process resulting in a first determination. Next, step 3108 comprises responsive to the first determination being that the version of the application under test actually exists in the first particular software environment, automatically running without user interaction a second process to attempt to instantiate (e.g., execute on a computer) an instance of the version of the application under test that actually exists in the first particular software environment, the second process resulting in a second determination. Next, step 3110 comprises responsive to the second determination being that the application under test that actually exists in the first particular software environment has been instantiated, running a third process to determine whether the version of the another application actually exists in the second particular software environment, the third process resulting in a third determination. Next, step 3112 comprises responsive to the third determination being that the version of the another application actually exists in the second particular software environment, automatically running without user interaction a fourth process to attempt to instantiate (e.g., execute on a computer) an instance of the version of the another application that actually exists in the second particular software environment, the fourth process resulting in a fourth determination. Next, step 3114 comprises automatically outputting without user interaction an indication of the first determination, the second determination, the third determination, and the fourth determination.

While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3C:
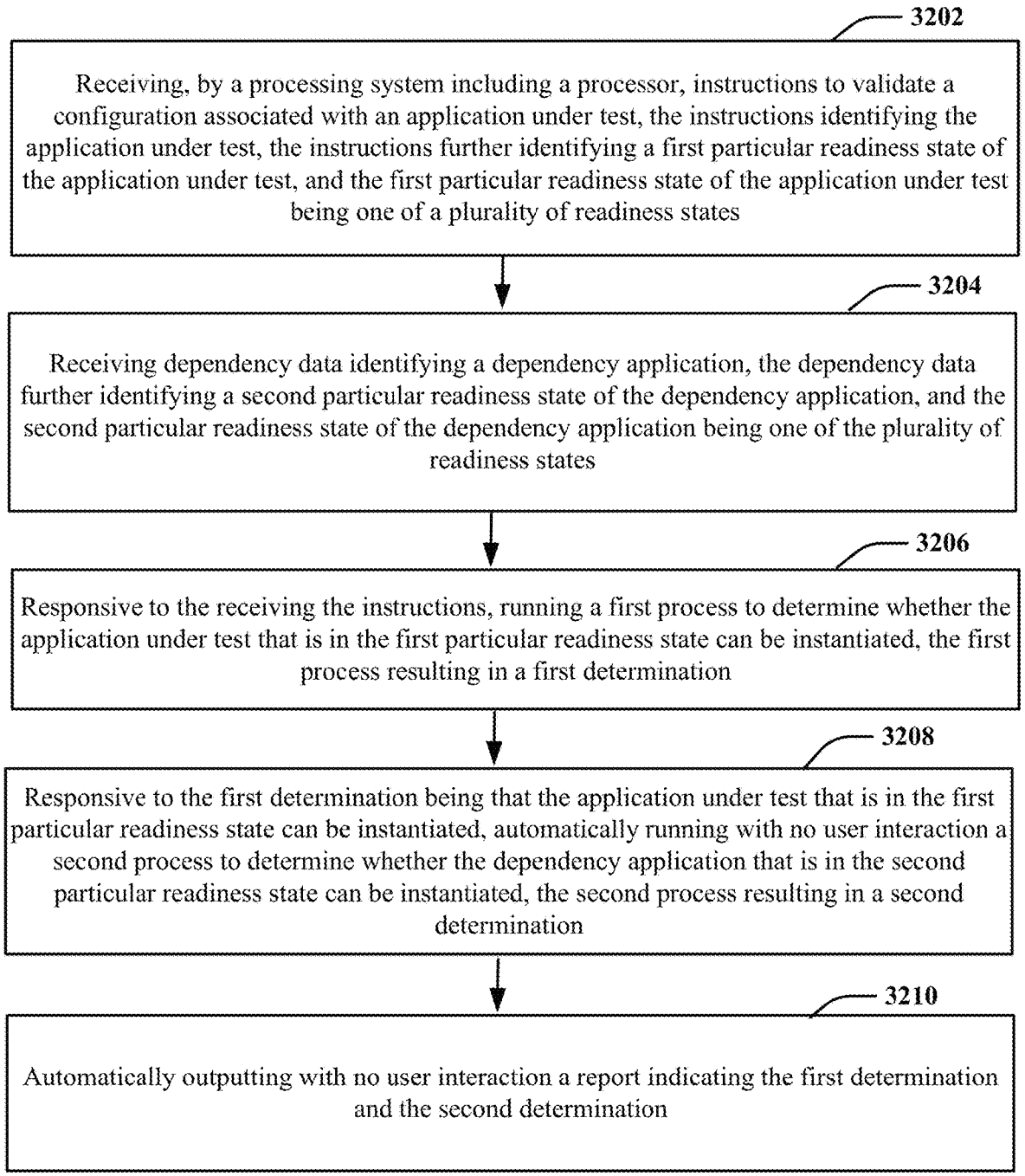
FIG. 3C depicts an illustrative embodiment of a method in accordance with various aspects described herein.

Referring now to FIG. 3C, various steps of a method 3200 according to an embodiment are shown. As seen in this FIG. 3C, step 3202 comprises receiving, by a processing system including a processor, instructions to validate a configuration associated with an application under test, the instructions identifying the application under test, the instructions further identifying a first particular readiness state of the application under test, and the first particular readiness state of the application under test being one of a plurality of readiness states. Next, step 3204 comprises receiving, by the processing system, dependency data identifying a dependency application, the dependency data further identifying a second particular readiness state of the dependency application, and the second particular readiness state of the dependency application being one of the plurality of readiness states. Next, step 3206 comprises responsive to the receiving the instructions, running, by the processing system, a first process to determine whether the application under test that is in the first particular readiness state can be instantiated (e.g., run on a computer), the first process resulting in a first determination. Next, step 3208 comprises responsive to the first determination being that the application under test that is in the first particular readiness state can be instantiated, automatically running, by the processing system, with no user interaction a second process to determine whether the dependency application that is in the second particular readiness state can be instantiated (e.g., run on a computer), the second process resulting in a second determination. Next, step 3210 comprises automatically outputting, by the processing system, with no user interaction a report indicating the first determination and the second determination.

While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide an inter-system dependency validator.

As described herein, various embodiments can provide a graphical user interface (GUI) that shows a "live" view (e.g., a real-time view) of dependencies for a given application, wherein each of the dependencies is shown in the "live" view in association with a respective URL.

As described herein, various embodiments can utilize a database that stores metadata that identifies dependencies among components/microservices/applications. In one example, the database can be queried by the system to return information regarding the component/microservice/application and the dependencies. In one example, the metadata can identify who (which application) is dependent upon who (which other application).

As described herein, various embodiments can operate recursively, such that configuration/dependency checking is done for each subsequent downstream component/microservice/applications.

As described herein, various embodiments can operate to identify one or more missing dependencies and/or one or more wrong environments (e.g., DEV vs TEST).

As described herein, various embodiments can provide functionality to heal (e.g., update DEV to TEST).

As described herein, each environment (or phase) can be selected from development, test, user acceptance, production. As described herein, each of the environments can have therein multiple versions or releases of a given component/microservice/application (e.g., quarterly release or monthly release).

As described herein, various embodiments can provide a proactive mechanism that can find (e.g., at an early time) any misconfigurations.

As described herein, various embodiments can provide a capability to heal. In one example, various embodiments can provide the capability to fix misconfiguration(s) by triggering an update of a given component's/microservice's/application's configuration. In another example, various embodiments can provide the capability to fix misconfiguration(s) by causing a reboot of a given component/microservice/application if needed.

As described herein, various embodiments can provide a capability to predict. In one example, various embodiments can provide AI (artificial intelligence) and/or ML (machine learning) capabilities. In another example, various embodiments can provide the capability to auto-predict one or more dependency failures based on historical data and/or based on a "live" snapshot.

As described herein, various embodiments can facilitate ensuring that all dependencies (e.g., components/microservices/applications) have their correct instances configured to perform the system function (e.g., overall system function).

As described herein, various embodiments can facilitate ensuring that all dependencies (e.g., components/microservices/applications) are in a healthy state.

As described herein, various embodiments can facilitate certifying a system.

As described herein, various embodiments can facilitate early discovering and handling of issue(s) caused by any misconfigured and/or unavailable dependency.

As described herein, various embodiments can provide a mechanism applicable to enterprise applications, where a system can be comprised of multiple components/apps (and wherein it has conventionally been challenging with respect to such a system to ensure each element is pointing to correct & available dependency).

As described herein, various embodiments can provide a "live" inter-system dependency view of an ecosystem.

As described herein, various embodiments can avoid late identification of any misconfigured interface connectivity.

As described herein, various embodiments can operate in the context of a large number of applications (and large number of respective instances), wherein the number of possible configuration combinations would grow exponentially.

As described herein, various embodiments can facilitate finding configuration combination(s) that would be considered as invalid.

As described herein, various embodiments can operate in the context of components/microservices/applications that are owned by (and/or are the responsibility of) a plurality of teams (e.g., one component/microservice/application owned by (and/or the responsibility of) one team and another component/microservice/application owned by (and/or the responsibility of) another team) and in the context of components/microservices/applications that are not deployed at the same time (e.g., one component/microservice/application deployed at one time and another component/microservice/application deployed at another time).

As described herein, various embodiments can facilitate an elimination (or reduction) of issues (e.g., major issues) during production.

As described herein, various embodiments can facilitate end-to-end testing.

As described herein, various embodiments provide a mechanism to alleviate a situation wherein a system architect (or other person working on software) has to look through documents to see which system (or system component) is dependent on which other system (or system component).

As described herein, various embodiments can facilitate infrastructure maintenance and/or operations planning.

As described herein, various embodiments can facilitate agile and scaled agile methodologies (e.g., wherein software releases become more frequent with shorter planning cycles).

As described herein, various embodiments can facilitate validation in the context of a given component/microservice/application (e.g., existing in multiple available environments) having connectivity with one or more required upstream dependency components/microservices/applications and/or connectivity with one or more downstream dependency components/microservices/applications.

As described herein, various embodiments can provide a real-time inter-dependency view of a "live" ecosystem.

As described herein, various embodiments can provide up-front detection of one or more problems.

As described herein, various embodiments can provide mechanisms to fix dependencies which are pointing to wrong instance and/or are not available.

As described herein, various embodiments can provide one or more of the following benefits: (a) in the context of "Platform Testing"—time savings by resolving any misconfiguration(s) early; (b) in the context of "Infrastructure Operations"—facilitating a planning of one or more updates and/or one or more maintenance activities; (c) in the context of "System Architects"—helps to plan the new features/enhancements and/or to gain insights of a "live" ecosystem; and/or (d) in the context of "Production"—avoiding potential critical system failures (which can be avoided, for example, by early identification of one or more misconfigurations).

As described herein, various embodiments can be applied in the context of an enterprise architecture.

As described herein, various embodiments can facilitate early detection of inter-system dependency failures (e.g., which are pointing to wrong instance and/or are not available).

As described herein, various embodiments can avoid critical system function failure (e.g., can be avoided due to detection of the above-described misconfiguration(s)).

As described herein, various embodiments save time and effort during end-to-end testing.

As described herein, various embodiments can provide an end-to-end view of the systems (and/or system components) involved in a given enterprise (which, in turn, can help in planning of new features and/or enhancements).

As described herein, various embodiments can facilitate infrastructure operations planning (e.g., infrastructure operations planning with respect to updates/maintenance activities).

As described herein, various embodiments can provide a real-time inter-dependency view of a "live" ecosystem.

As described herein, a mechanism can be provided to determine whether a health (e.g., an operating condition) of a given component/microservice/application meets a threshold (e.g., the threshold being that the given component/microservice/application is capable of operation).

Figure 4:
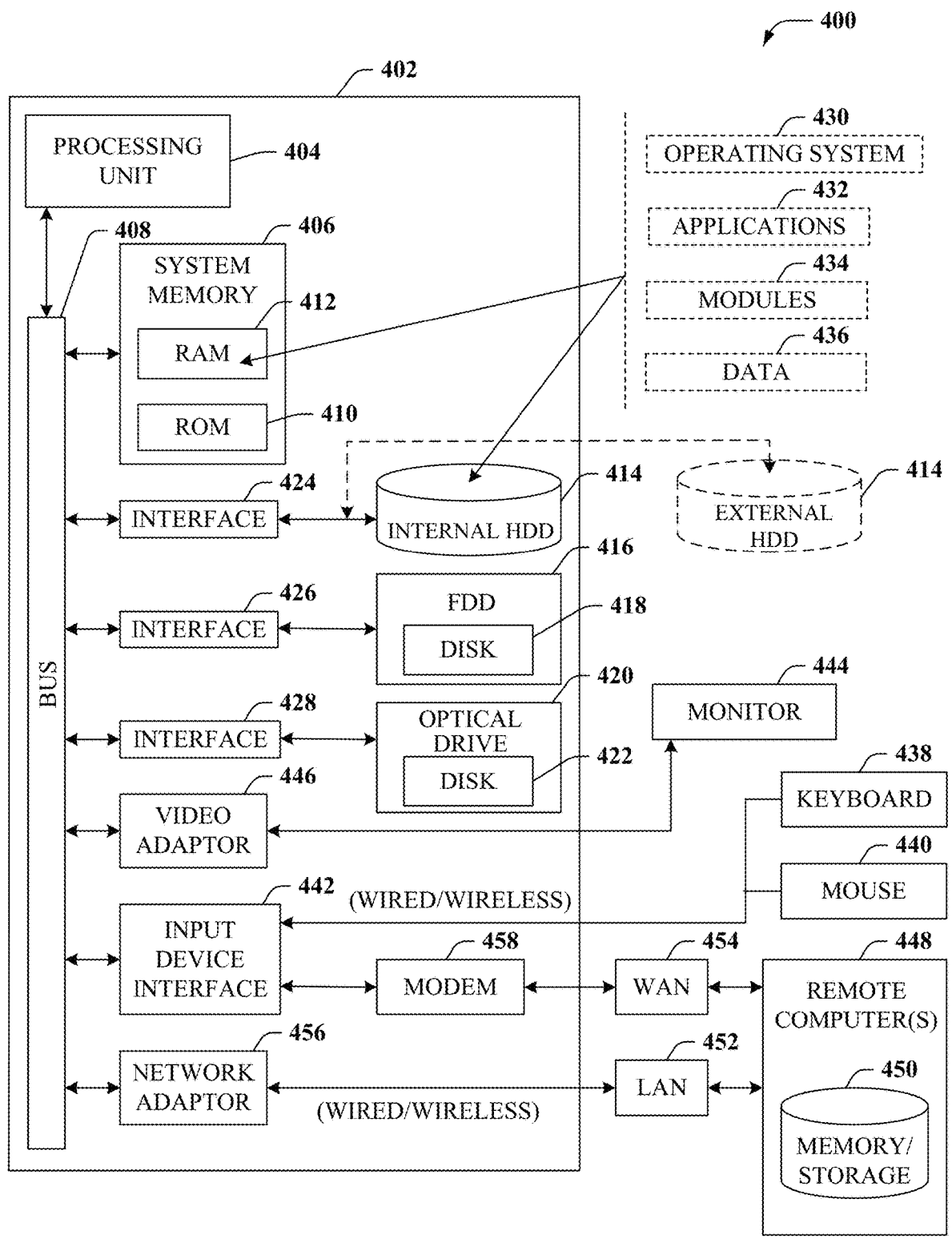
FIG. 4 is a block diagram of an example, non-limiting embodiment of a computing infrastructure in accordance with various aspects described herein.

Turning now to FIG. 4, there is illustrated a block diagram of a computing infrastructure in accordance with various aspects described herein. In order to provide additional context for various embodiments of the embodiments described herein, FIG. 4 and the following discussion are intended to provide a brief, general description of a suitable computing infrastructure 400 in which the various embodiments of the subject disclosure can be implemented. For example, computing infrastructure 400 can facilitate in whole or in part validation of configurations and dependencies associated with software, software components, microservices and the like. Various elements can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing contexts where certain tasks are performed by remote processing devices that are linked through a communications network. In a distributed computing context, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example infrastructure can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating context, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked context using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking contexts are commonplace in offices and companies, and facilitate enterprise-wide computer networks, such as intranets, all of which can connect to a global communications network, e.g., the Internet.

When used in a LAN networking context, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking context, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked context, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
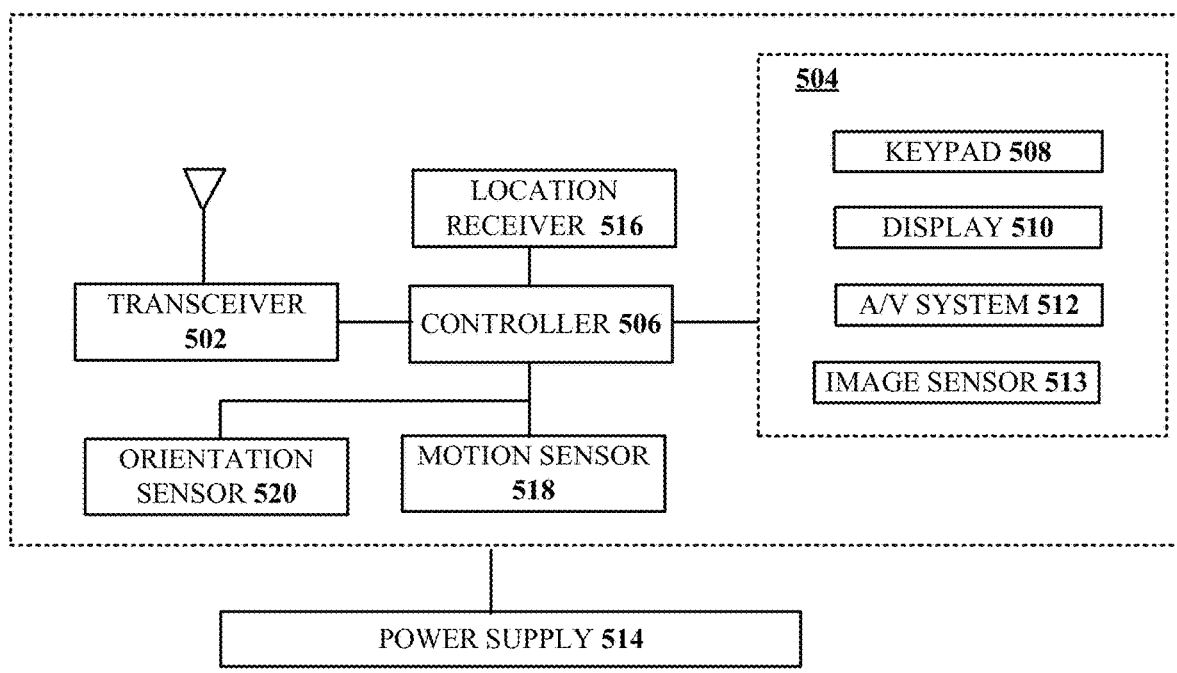
FIG. 5 is a block diagram of an example, non-limiting embodiment of a communication device in accordance with various aspects described herein.

Turning now to FIG. 5, an illustrative embodiment of a communication device 500 is shown. In various examples, computing device 500 can facilitate in whole or in part validation of configurations and dependencies associated with software, software components, microservices and the like.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing contexts where tasks are performed by remote processing devices that are linked through a communications network; however, some if not all aspects of the subject disclosure can be practiced on stand-alone computers. In a distributed computing context, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically validating configurations and dependencies associated with software, software components, microservices and the like) can employ various AI-based schemes for carrying out various embodiments thereof. Moreover, the classifier can be employed to determine a ranking or priority of each validation, configuration, and/or dependency. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to validation of configurations and dependencies associated with software, software components, microservices and the like.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
   a processing system including a processor; and
   a memory that stores executable instructions that, when executed by the processing system, facilitate performance of operations, the operations comprising:
      receiving instructions to validate a configuration associated with an application under test, the instructions identifying the application under test that exists in a first particular software environment that is selected from among a plurality of software environments;
      receiving dependency data that is separate from the application under test, the dependency data identifying a dependency application that exists in a second particular software environment that is selected from among the plurality of software environments;
      responsive to the receiving the instructions, performing a first process to determine whether the application under test that exists in the first particular software environment can be instantiated as a first running application, the first process resulting in a first determination;
      responsive to the first determination being that the application under test that exists in the first particular software environment can be instantiated as the first running application, automatically performing with no user interaction a second process to determine whether the dependency application that exists in the second particular software environment can be instantiated as a second running application, the second process resulting in a second determination; and
      automatically outputting with no user interaction a report indicating the first determination and the second determination.

2. The device of claim 1, wherein each of the first particular software environment and the second particular software environment is one of a development environment, a testing environment, a staging environment, a user acceptance environment, or a production environment.

3. The device of claim 2, wherein the first particular software environment and the second particular software environment are a same software environment.

4. The device of claim 1, wherein the instructions include an identification of a version of the application under test, and wherein the first process comprises an attempt to instantiate as the first running application the version of the application under test from the first particular software environment.

5. The device of claim 4, wherein the first determination is that the version of the application under test has been instantiated as the first running application as a result of the attempt being successful.

6. The device of claim 1, wherein the dependency data includes an identification of a version of the dependency application that exists in the second particular software environment.

7. The device of claim 6, wherein the second process comprises an attempt to instantiate as the second running application the version of the dependency application from the second particular software environment.

8. The device of claim 7, wherein the second determination is that the version of the dependency application has been instantiated as the second running application as a result of the attempt being successful.

9. The device of claim 1, wherein the instructions are received responsive to user input to a graphical user interface, and wherein the report is output to the graphical user interface.

10. The device of claim 1, wherein the instructions are received responsive to a reboot of the application under test.

11. The device of claim 1, wherein:
the application under test comprises a first component, a first microservice, a first functionality, a first set of functionalities, or a first combination thereof; and
the dependency application comprises a second component, a second microservice, a second functionality, a second set of functionalities, or a second combination thereof.

12. The device of claim 1, wherein:
the dependency application exists in at least two of the plurality of software environments; and
the second process comprises selecting, based upon the dependency data, the dependency application from the second particular software environment to be instantiated as the second running application.

13. The device of claim 1, wherein:
the dependency data identifies a version of the dependency application that exists in the second particular software environment and the dependency data further identifies as another dependency a third application that exists in a third particular software environment;
the operations further comprise, responsive to the second determination being that the dependency application can be instantiated as the second running application, performing a third process to determine whether the third application that exists in the third particular software environment can be instantiated as a third running application, the third process resulting in a third determination; and
including in the report that is output an indication of the third determination.

14. The device of claim 13, wherein the third process comprises an attempt to instantiate as the third running application a version of the third application that exists in the third particular software environment.

15. The device of claim 14, wherein the third determination is that the version of the third application has been instantiated as the third running application as a result of the attempt being successful.

16. A non-transitory machine-readable medium comprising executable instructions that, when executed by a processing system including a processor, facilitate performance of operations, the operations comprising:
receiving instructions to validate a configuration associated with an application under test, the instructions identifying a version of the application under test that is indicated as existing in a first particular software environment;
receiving dependency data identifying as a dependency a version of another application that is indicated as existing in a second particular software environment, the dependency data being separate from the application under test;
performing a first process to determine whether the version of the application under test actually exists in the first particular software environment, the first process resulting in a first determination;
responsive to the first determination being that the version of the application under test actually exists in the first particular software environment, automatically performing without user interaction a second process to attempt to instantiate as a first running application the version of the application under test that actually exists in the first particular software environment, the second process resulting in a second determination;
responsive to the second determination being that the application under test that actually exists in the first particular software environment has been instantiated as the first running application, performing a third process to determine whether the version of the another application actually exists in the second particular software environment, the third process resulting in a third determination;
responsive to the third determination being that the version of the another application actually exists in the second particular software environment, automatically performing without user interaction a fourth process to attempt to instantiate as a second running application the version of the another application that actually exists in the second particular software environment, the fourth process resulting in a fourth determination; and
automatically outputting without user interaction an indication of the first determination, the second determination, the third determination, and the fourth determination.

17. The non-transitory machine-readable medium of claim 16, wherein:
each of the first particular software environment and the second particular software environment is one of a development environment, a testing environment, a staging environment, or a production environment; and
each of the development environment, the testing environment, the staging environment, and the production environment is partitioned separately from the other on a computer system.

18. The non-transitory machine-readable medium of claim 16, wherein the indication is output to a display, to a printer, or to any combination thereof, and wherein the first particular software environment and the second particular software environment are a same software environment.

19. A method comprising:
receiving, by a processing system including a processor, instructions to validate a configuration associated with an application under test, the instructions identifying the application under test, the instructions further identifying a first particular readiness state of the application under test, and the first particular readiness state of the application under test being one of a plurality of readiness states;

receiving, by the processing system, dependency data identifying a dependency application, the dependency data further identifying a second particular readiness state of the dependency application, and the second particular readiness state of the dependency application being one of the plurality of readiness states;

responsive to the receiving the instructions, performing, by the processing system, a first process to determine whether the application under test that is in the first particular readiness state can be instantiated as a first running application, the first process resulting in a first determination;

responsive to the first determination being that the application under test that is in the first particular readiness state can be instantiated as the first running application, automatically performing, by the processing system, with no user interaction a second process to determine whether the dependency application that is in the second particular readiness state can be instantiated as a second running application, the second process resulting in a second determination; and automatically outputting, by the processing system, with no user interaction a report indicating the first determination and the second determination.

20. The method of claim 19, wherein:

the second particular readiness state of the dependency application is a same readiness state as the first particular readiness state of the application under test; and the same readiness state is one of a development state, a testing state, a staging state, a user acceptance state, or a production state.

\* \* \* \* \*